(12) United States Patent
Somarowthu et al.

(10) Patent No.: US 9,763,291 B2
(45) Date of Patent: Sep. 12, 2017

(54) SINGLE STAGE POWER FACTOR CORRECTED LED DRIVER CIRCUIT

(71) Applicant: HONEYWELL INTERNATIONAL INC., Morristown, NJ (US)

(72) Inventors: Pandu Ranga Rao Somarowthu, Karnataka (IN); Sunit Kumar Saxena, Karnataka (IN); Deepak Bhimrao Mahajan, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/830,026

(22) Filed: Aug. 19, 2015

(65) Prior Publication Data
US 2017/0055320 A1    Feb. 23, 2017

(51) Int. Cl.
H05B 33/08    (2006.01)
H02M 1/42    (2007.01)
H02M 3/158    (2006.01)
H02M 7/06    (2006.01)

(52) U.S. Cl.
CPC ...... *H05B 33/0815* (2013.01); *H02M 1/4208* (2013.01); *H02M 7/06* (2013.01); *H05B 33/083* (2013.01)

(58) Field of Classification Search
None
See application file for complete search history.

(56) References Cited

U.S. PATENT DOCUMENTS

| 8,228,001 B2 | 7/2012 | Fan |
| 2003/0122502 A1 | 7/2003 | Clauberg et al. |
| 2008/0224625 A1 | 9/2008 | Greenfeld |
| 2011/0216567 A1 | 9/2011 | Fan |
| 2012/0104972 A1* | 5/2012 | Taubert ......... H05B 41/24 315/294 |

(Continued)

FOREIGN PATENT DOCUMENTS

CN    203788519 U    8/2014

OTHER PUBLICATIONS

Bhim Singh, et al.; A Single Stage Optocoupler-Less Buck-Boost PFC Driver for LED Lamp at Universal AC Mains; 2013-IACC-306; 978-1-4673-5202-4/12/$31.00 © 2013 IEEE.

(Continued)

*Primary Examiner* — Dedei K Hammond
(74) *Attorney, Agent, or Firm* — Lorenz & Kopf, LLP

(57) ABSTRACT

A single-stage power factor corrected light emitting diode (LED) driver circuit having a circuit input node, a circuit output node, and a circuit common node includes a first inductor, a second inductor, a coupling capacitor, a controllable switch, and an LED string. The first inductor is electrically connected in series between the circuit input node and the coupling capacitor, the second inductor is electrically connected in series between the circuit output node and the circuit common node, the coupling capacitor is electrically connected in series between the first inductor and the circuit output node, the controllable switch is electrically connected in series between a first internal circuit node and the circuit common node, the first internal circuit node located between the first inductor and the coupling capacitor, and the LED string is electrically connected in parallel with only the second inductor.

13 Claims, 4 Drawing Sheets

(56) References Cited

U.S. PATENT DOCUMENTS

2013/0119868 A1* 5/2013 Saxena .............. H05B 33/0815
    315/122
2014/0117878 A1    5/2014 Prodic et al.
2015/0195878 A1* 7/2015 Garrity .............. H05B 33/0821
    315/186

OTHER PUBLICATIONS

Extended EP Search Report for Application No. 16184403.0-1802 dated Jan. 17, 2017.

* cited by examiner

SINGLE STAGE POWER FACTOR CORRECTED LED DRIVER CIRCUIT

TECHNICAL FIELD

The present invention generally relates to a driver circuit for light emitting diodes (LEDs), and more particularly relates to a single-stage power factor corrected LED driver circuit.

BACKGROUND

In recent years, there has been an ever-increasing demand for power electronics to drive LED based lighting systems. Along with this is the demand for improving the power quality of the AC systems supplying the power electronics. Various options are available to improve the power quality of AC systems. One of the options that is gaining in popularity is the active shaping of the input line current (i.e., active Power Factor Correction (PFC)), since it makes the load appear as a pure resistance, leading to near unity load power factor and generating negligible harmonics in the input current.

One well-known active PFC LED driver is a two-stage Boost-Buck power supply circuit. With this type of circuit, a boost stage acts as a front end PFC due to its smoothly varying input current and simplicity, and buck stage acts as the LED driver. In spite of its simplicity, this two-stage active PFC LED driver requires two different control circuits to harmonize the input current and to regulate the current through the LEDs. In addition, the boost stage can exhibit start-up over-currents, which can require additional protection circuitry.

Another well-known active PFC LED driver is a single-stage SEPIC ( ) PFC driver. This type of driver uses only one switch to harmonize the input current and to regulate the current through LEDs. Although the single-stage SEPIC uses only one switch, and thus one control circuit, it too exhibits certain drawbacks. Namely, this driver type includes a bulk storage capacitor and an output diode, which requires more board space and increases the weight of the driver.

For space constrained LED applications, such as aerospace exterior lighting applications, one of the key objectives is to provide an optimized solution from weight, volume, and cost perspectives. Moreover, for retrofit applications, providing a solution that is an integrated power supply provides the advantage of a drop-in replacement for existing filament based light systems with LED based light systems.

Hence, there is a need for a power factor corrected LED driver circuit that does not rely on multiple switches, a bulk storage capacitor, and an output diode, and/or provides optimized solution from weight, volume, and cost perspectives. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a single-stage power factor corrected light emitting diode (LED) driver circuit having a circuit input node, a circuit output node, and a circuit common node includes a first inductor, a second inductor, a coupling capacitor, a controllable switch, and an LED string. The first inductor is electrically connected in series between the circuit input node and the coupling capacitor, the second inductor is electrically connected in series between the circuit output node and the circuit common node, the coupling capacitor is electrically connected in series between the first inductor and the circuit output node, the controllable switch is electrically connected in series between a first internal circuit node and the circuit common node, the first internal circuit node located between the first inductor and the coupling capacitor, and the LED string is electrically connected in parallel with only the second inductor.

In another embodiment, a single-stage power factor corrected light emitting diode (LED) driver circuit including a circuit output node and a circuit common node includes a rectifier circuit including a first AC input terminal, a second AC input terminal, a rectifier output terminal, and a rectifier return terminal. It additionally includes a first inductor, a second inductor, a coupling capacitor, a controllable switch, and an LED string. The rectifier output terminal is electrically connected to the first inductor, the rectifier return terminal is electrically connected to the circuit common node, the first inductor is electrically connected in series between the rectifier output terminal and the coupling capacitor, the second inductor is electrically connected in series between circuit output node and the circuit common node, the coupling capacitor is electrically connected in series between the first inductor and the circuit output node, the controllable switch is electrically connected in series between a first internal circuit node and the circuit common node, the first internal circuit node located between the first inductor and the coupling capacitor, and the LED string is electrically connected in parallel with only the second inductor.

In yet another embodiment, a single-stage power factor corrected light emitting diode (LED) driver circuit including a circuit output node and a circuit common node includes a single-phase AC power source configured to supply single-phase AC power, and a rectifier circuit including a first AC input terminal, a second AC input terminal, a rectifier output terminal, and a rectifier return terminal. The driver circuit additionally includes a first inductor, a second inductor, a coupling capacitor, a controllable switch configured to selectively operate in an ON state, in which current will flow through the controllable switch, and an OFF state, in which current will not flow through the controllable switch, an LED string, and a controller coupled to the controllable switch and configured to command the controllable switch to selectively operate in the ON state and the OFF state. The first AC input terminal and the second AC input terminal are electrically connected to the single-phase AC power source, the rectifier output terminal is electrically connected to the first inductor, the rectifier output return terminal is electrically connected to the circuit common node, the first inductor is electrically connected in series between the rectifier output terminal and the coupling capacitor, the second inductor is electrically connected in series between circuit output node and the circuit common node, the coupling capacitor is electrically connected in series between the first inductor and the circuit output node, the controllable switch is electrically connected in series between a first internal circuit node and the circuit common node, the first internal circuit node located between the first inductor and the coupling capacitor, and the LED string is electrically connected in parallel with only the second inductor.

Furthermore, other desirable features and characteristics of the LED driver circuit will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
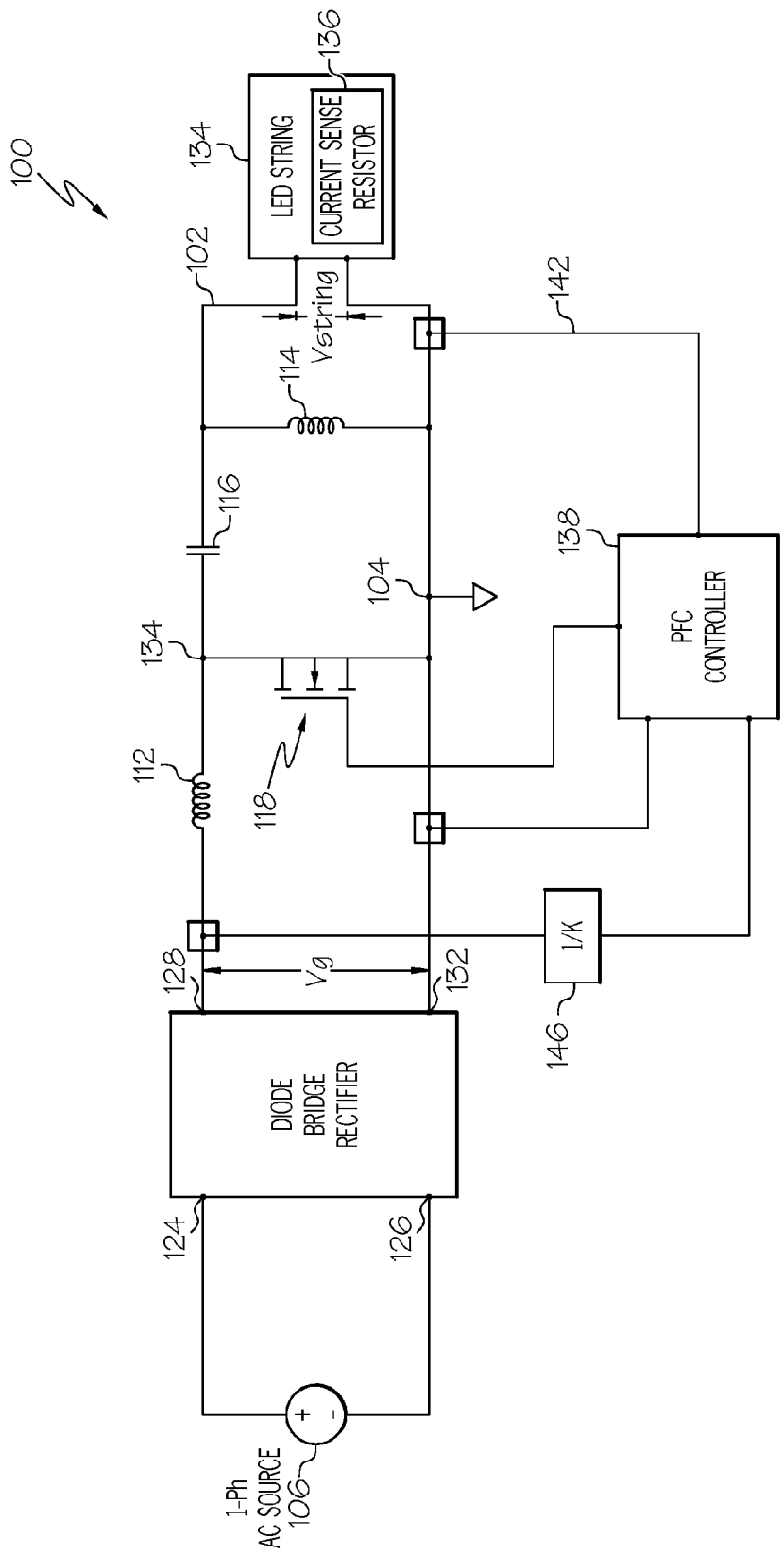
FIG. 1 depicts a functional block diagram of a single-stage active power factor corrected light emitting diode (LED) driver circuit.

Referring now to FIG. 1, a functional block diagram of a single-stage active power factor corrected (PFC) light emitting diode (LED) driver circuit 100 is depicted. The driver circuit 100 includes a circuit output node 102, a circuit common node 104, an AC power source 106, a rectifier circuit 108, a first inductor 112, a second inductor 114, a coupling capacitor 116, a controllable switch 118, and an LED string 122.

The AC power source 106 is preferably a single-phase AC power source that is configured to supply single-phase AC power. It will be appreciated that the amplitude and frequency of the AC power that is supplied may vary. In a typical embodiment, however, the amplitude and frequency are 115 VAC and 400 Hz.

The rectifier circuit 108 includes a first AC input terminal 124, a second AC input terminal 126, a rectifier output terminal 128, and a rectifier return terminal 132. The first AC input terminal 124 and the second AC input terminal 126 are electrically connected to the single-phase AC power source 106, the rectifier output terminal 128 is electrically connected to the first inductor 112, and the rectifier return terminal 132 is electrically connected to the circuit common node 104. The rectifier circuit 108, as is generally known, is configured to convert the single-phase AC power into DC power. It will be appreciated that the rectifier circuit 108 may be variously implemented, but in one particular embodiment it is implemented using the well-known full-wave diode bridge rectifier circuit.

Turning now to the remainder of the circuit, it is seen that the first inductor 112 is electrically connected in series between the rectifier output terminal 128 and the coupling capacitor 116, the second inductor 114 is electrically connected in series between the circuit output node 102 and the circuit common node 104, the coupling capacitor 116 is electrically connected in series between the first inductor 112 and the circuit output node 102, and the controllable switch 118 is electrically connected in series between a first internal circuit node 134 and the circuit common node 104. As depicted, the first internal circuit node 134 is located between the first inductor 112 and the coupling capacitor 116.

The controllable switch 118 may be variously implemented. Preferably, however, it is implemented using a solid-state switch. Although numerous and varied solid-state switches may be used, such as, for example, an insulated gate bipolar transistor (IGBT) or various other types of transistors, in the depicted embodiment the controllable switch is implemented using a MOSFET (metal-oxide semiconductor field effect transistor).

Regardless of how the controllable switch 118 is implemented, it is configured to selectively operate in an ON state and OFF state. In the ON state, current will flow through the controllable switch 118. Conversely, in the OFF state, current will not flow through the controllable switch.

The LED string 122 is electrically connected to the circuit output node 102 and the circuit common node 104 in a manner that it is electrically connected in parallel with only the second inductor 114. That is, unlike presently known PFC driver circuits, the driver circuit 100 depicted in FIG. 1 does not have either (or both) an output diode or a bulk storage capacitor electrically connected to the LED string 122. It will be appreciated that the number and type of LEDs included in the LED string may vary, though it will include a plurality of series-connected and/or series/parallel-connected LEDs.

As FIG. 1 also depicts, the driver circuit 100 additionally includes a current sense resistor 136 and a controller 138. The current sense resistor 136 is coupled to the LED string 122 and is configured to supply an LED string current feedback signal 142 to the controller 138 that is representative of current flow through the LED string. The controller 138 is coupled to the controllable switch 118, and is also coupled to receive the LED string current feedback signal 142 and a reference voltage signal 144 via a multiplier 146. The controller 138 is configured, in response to the LED string current feedback signal 142 and the reference voltage signal 144, to command the controllable switch 118, in a well-known manner, to selectively operate in the ON state and the OFF state.

Figure 2:
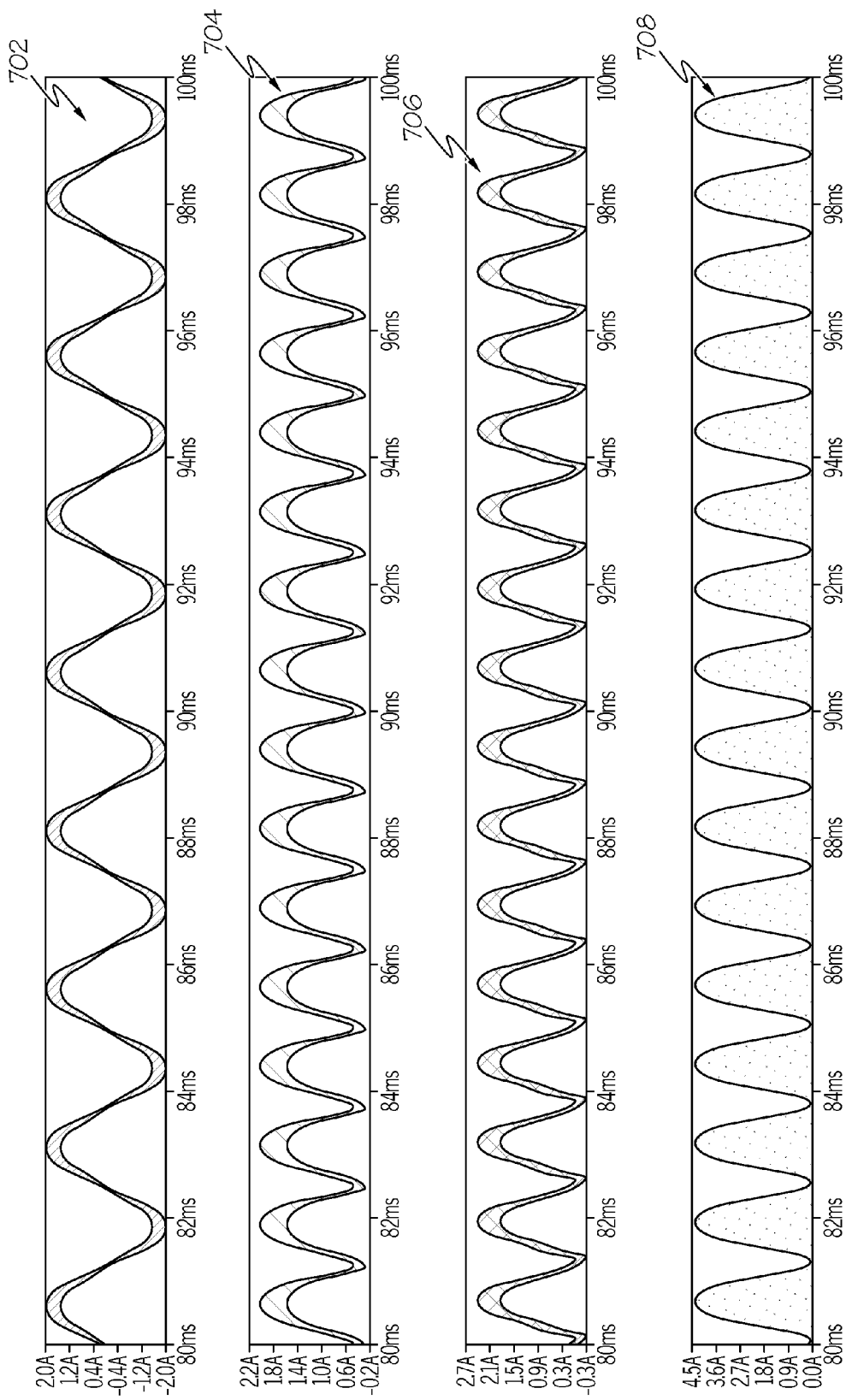
FIG. 2 depicts current flow through various components of the single-stage active power factor corrected LED driver circuit of FIG. 1 over a 20 millisecond time span.
Figure 3:
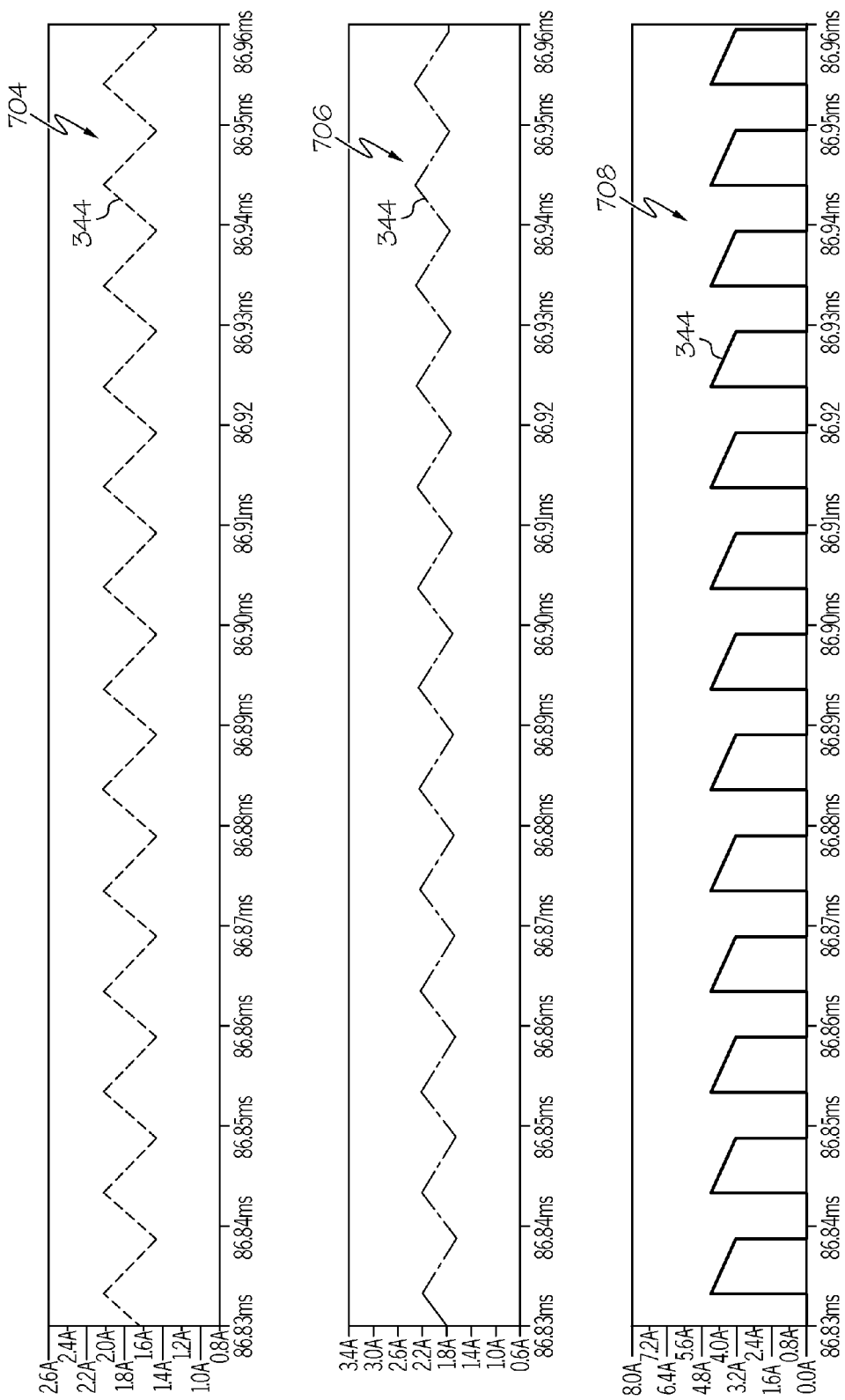
FIG. 3 depicts current flow through various components of the single-stage active power factor corrected LED driver circuit of FIG. 1 over a 0.13 millisecond time span.

With reference now to FIGS. 2 and 3, simulation results for the driver circuit 100 depicted in FIG. 1 and described above are illustrated. These depicted results are for an AC power source 106 that is supplying a single-phase AC voltage of 90-140V RMS (nominal 115 VAC) at 400 Hz, and the LED string 122 comprises 16 LEDs connected in series. The driver circuit 100 is able to achieve a power factor of 0.99385 with negligible noise in the input current.

More specifically, FIG. 2 depicts the input line current (702), the current through the first inductor 112 (704), the current through the second inductor 114 (706), and the current through the LED string 122 (708) over a time-span of 20 milliseconds (msec). FIG. 3 depicts the current through the first inductor 112 (704), the current through the second inductor 114 (706), and the current through the LED string 122 (708) over a time-span of 0.13 msec, which more clearly illustrates the pulsed current through the LED string 122.

It should be noted that even though the current flowing through the LED string 122 is pulsed, the intensity pattern of the LED string 122 is not noticeably changed, and allows the LED string 122 to be operated with relatively high current repetitive pulsing. The peak instantaneous current magnitude depends mainly upon the duty cycle (D). In this regard, it is noted that the steady-state voltage transfer ratio of the driver circuit 100 under ideal conditions is given by the following equation, and is depicted graphically in FIG. 4:

$$\frac{V_{string}}{V_g} = \frac{D}{1-D}$$

where:
$V_{string}$ is the voltage across the LED string 122,
$V_g$ is the voltage at the output of the rectifier circuit 108, and
D is the duty cycle.

Figure 4:
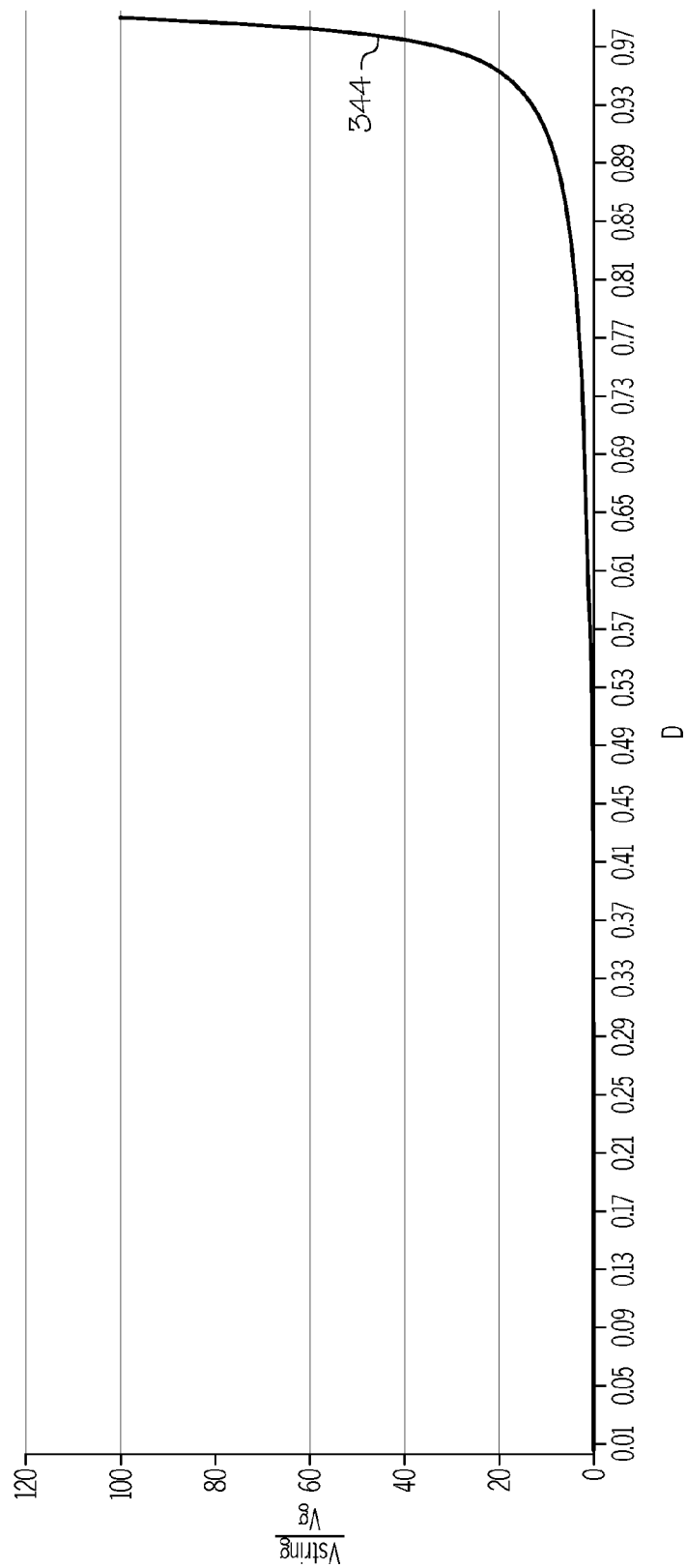
FIG. 4 depicts the steady-state voltage transfer ratio of the single-stage active power factor corrected LED driver circuit of FIG. 1 under ideal conditions.

From FIG. 4 it is clear that the single-stage power factor corrected light emitting diode (LED) driver circuit 100 described herein can be operated in either Buck or Boost modes. Unlike conventional two-stage LED drivers, the inherent Buck-Boost nature of the single-stage power factor corrected light emitting diode (LED) driver circuit 100 disclosed herein does not rely on the use of two switches, nor the associated control circuitry, and allows the input current to be harmonized and the LED current modulated.

The single-stage power factor corrected light emitting diode (LED) driver circuit 100 disclosed herein also does not include a bulk energy storage capacitor or an output diode. This provides improved response time and transient performance, and improves the reliability of the overall system. The single-stage power factor corrected light emitting diode (LED) driver circuit 100 disclosed herein is attractive for low and medium power applications from the perspective of costs, weight, and complexity, and is free from the problems associated with the conventional approaches.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

As used herein, when the phrase "coupled to" is used in describing a relationship between different elements, this phrase does not imply that a direct physical connection must be made between these elements. For example, two elements may be coupled to each other physically, electronically, logically, or in any other manner, through one or more additional elements. However, when the phrase "electrically connected to" is used in describing a relationship between different elements, this phrase does imply a direct physical connection between these elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A single-stage power factor corrected light emitting diode (LED) driver circuit having a circuit input node, a circuit output node, and a circuit common node, the driver circuit comprising:
    a first inductor;
    a second inductor;
    a coupling capacitor;
    a controllable switch configured to selectively operate in an ON state, in which current will flow through the controllable switch, and an OFF state, in which current will not flow through the controllable switch;
    an LED string; and
    a controller coupled to the controllable switch, and further coupled to receive a reference voltage input and an LED string current feedback signal representative of current flow through the LED string, the controller configured, in response to only the LED string current feedback signal and the reference voltage signal, to command the controllable switch to selectively operate in the ON state and the OFF state,
wherein:
    the first inductor is electrically connected in series between the circuit input node and the coupling capacitor,
    the second inductor is electrically connected in series between the circuit output node and the circuit common node,
    the coupling capacitor is electrically connected in series between the first inductor and the circuit output node,
    the controllable switch is electrically connected in series between a first internal circuit node and the circuit common node, the first internal circuit node located between the first inductor and the coupling capacitor, and
    the LED string is electrically connected in parallel with only the second inductor.

2. The driver circuit of claim 1, further comprising:
    a current sense resistor coupled to the LED string and the controller and configured to supply the LED string current feedback.

3. The driver circuit of claim 1, further comprising:
    a multiplier coupled between the circuit input node and the controller and configured to supply the reference voltage signal.

4. The driver circuit of claim 1, wherein the controllable switch is a solid-state switch.

5. The driver circuit of claim 4, wherein the solid-state switch is a MOSFET.

6. A single-stage power factor corrected light emitting diode (LED) driver circuit including a circuit output node and a circuit common node, comprising:
    a rectifier circuit including a first AC input terminal, a second AC input terminal, a rectifier output terminal, and a rectifier return terminal;
    a first inductor;

a second inductor;
a coupling capacitor;
a controllable switch configured to selectively operate in an ON state, in which current will flow through the controllable switch, and an OFF state, in which current will not flow through the controllable switch;
an LED string; and
a controller coupled to the controllable switch, and further coupled to receive a reference voltage input and an LED string current feedback signal representative of current flow through the LED string, the controller configured, in response to only the LED string current feedback signal and the reference voltage signal, to command the controllable switch to selectively operate in the ON state and the OFF state.
wherein:
the rectifier output terminal is electrically connected to the first inductor,
the rectifier return terminal is electrically connected to the circuit common node,
the first inductor is electrically connected in series between the rectifier output terminal and the coupling capacitor,
the second inductor is electrically connected in series between circuit output node and the circuit common node,
the coupling capacitor is electrically connected in series between the first inductor and the circuit output node,
the controllable switch is electrically connected in series between a first internal circuit node and the circuit common node, the first internal circuit node located between the first inductor and the coupling capacitor, and
the LED string is electrically connected in parallel with only the second inductor.

7. The driver circuit of claim 6, further comprising:
a current sense resistor coupled to the LED string and the controller and configured to supply the LED string current feedback.

8. The driver circuit of claim 6, further comprising:
a multiplier coupled between the rectifier output terminal and the controller and configured to supply the reference voltage signal.

9. The driver circuit of claim 6, wherein the controllable switch is a solid-state switch.

10. The driver circuit of claim 9, wherein the solid-state switch is a MOSFET.

11. The driver circuit of claim 9, further comprising:
a current sense resistor coupled to the LED string and the controller and configured to supply the string current feedback; and
a multiplier coupled between the rectifier output terminal and the controller and configured to supply a reference voltage signal.

12. A single-stage power factor corrected light emitting diode (LED) driver circuit including a circuit output node and a circuit common node, comprising:
a single-phase AC power source configured to supply single-phase AC power;
a rectifier circuit including a first AC input terminal, a second AC input terminal, a rectifier output terminal, and a rectifier return terminal;
a first inductor;
a second inductor;
a coupling capacitor;
a controllable switch configured to selectively operate in an ON state, in which current will flow through the controllable switch, and an OFF state, in which current will not flow through the controllable switch;
an LED string; and
a controller coupled to the controllable switch, and further coupled to receive a reference voltage input and an LED string current feedback signal representative of current flow through the LED string, the controller configured, in response to only the LED string current feedback signal and the reference voltage signal to command the controllable switch to selectively operate in the ON state and the OFF state
wherein:
the first AC input terminal and the second AC input terminal are electrically connected to the single-phase AC power source,
the rectifier output terminal is electrically connected to the first inductor,
the rectifier output return terminal is electrically connected to the circuit common node,
the first inductor is electrically connected in series between the rectifier output terminal and the coupling capacitor,
the second inductor is electrically connected in series between circuit output node and the circuit common node,
the coupling capacitor is electrically connected in series between the first inductor and the circuit output node,
the controllable switch is electrically connected in series between a first internal circuit node and the circuit common node, the first internal circuit node located between the first inductor and the coupling capacitor, and
the LED string is electrically connected in parallel with only the second inductor.

13. The driver circuit of claim 11, wherein the controllable switch is a solid-state switch.

* * * * *